United States Patent
Arisawa

[11] Patent Number: 6,016,226
[45] Date of Patent: Jan. 18, 2000

[54] OBJECTIVE LENS FOR A MICROSCOPE

[75] Inventor: Katsuyoshi Arisawa, Kawasaki, Japan

[73] Assignee: Mitutoyo Corporation, Kawasaki, Japan

[21] Appl. No.: 09/035,764

[22] Filed: Mar. 6, 1998

[30] Foreign Application Priority Data

Mar. 12, 1997 [JP] Japan ..................... 9-057539

[51] Int. Cl.$^7$ ................................. G02B 21/02
[52] U.S. Cl. ............................ 359/661; 359/802
[58] Field of Search ................ 359/661, 802–805, 359/440–442

[56] References Cited

U.S. PATENT DOCUMENTS

| | | |
|---|---|---|
| 4,588,264 | 5/1986 | Shimizu . |
| 5,132,845 | 7/1992 | Suzuki . |
| 5,502,596 | 3/1996 | Suzuki .................. 359/657 |

FOREIGN PATENT DOCUMENTS

| | | |
|---|---|---|
| 60-209715 | 10/1985 | Japan . |
| 62-62317 | 3/1987 | Japan . |

*Primary Examiner*—Georgia Epps
*Assistant Examiner*—Michael A Lucas
*Attorney, Agent, or Firm*—Oliff & Berridge, PLC

[57] ABSTRACT

An objective lens for a microscope including a first lens group and a second lens group. The first lens group is positioned far from a surface of an object and has a negative refractive power as a whole. The second lens group is disposed between the object and the first lens group and has a positive refractive power as a whole. The first lens group includes two compound lenses, each with a convex lens and a concave lens, and the second lens group has a single convex lens and compound lenses. The objective lens is composed to satisfy the following conditions:

$$5F < D < 15F \quad (1)$$
$$F < |F1| < 2.5F \quad (2)$$
$$25 < \nu 2p - \nu 2n < 60 \quad (3)$$
$$0.01F < 1/r < 0.06F \quad (4)$$
$$1.6 < n \quad (5)$$

where D is the distance between the first lens group and the second lens group, F is the focal length of the objective lens, F1 is the focal length of the first lens group, $\nu 2p$ is the average Abbe number of the convex lenses of the second lens group, $\nu 2n$ is the average Abbe number of the concave lenses of the second lens group, r is radius of curvature of an object side surface of the meniscus lens disposed at the object side end, and n is the refractive index of the object side end lens at the d-line.

20 Claims, 6 Drawing Sheets

FIG. 4C
Y'=15
DISTORTION (%)

FIG. 4B
Y'=15
ASTIGMATISM (mm)

FIG. 4A
SPHERICAL ABERRATION (mm)

OBJECTIVE LENS FOR A MICROSCOPE

BACKGROUND OF THE INVENTION

1. Field of Invention

The present invention relates to an objective lens for a microscope of the infinity-correction type, and more particularly to an objective lens of a retrofocus optical system.

2. Description of Related Art

Recently, the demand for an objective lens of very high magnification, having a comparatively large numerical aperture (NA) for the inspection of integrated circuit (IC) wafers has increased, as IC wafers become increasingly integrated. In addition, more work is being performed by microscopic inspection, such as with devices for analyzing defective semiconductors. Where the conduction inspection is performed through a microscope, the objective lens of the microscope must have, not only very high magnification and resolution, but a long working distance.

In view of the above, the Applicant proposed an objective lens, as shown in the Japanese Laid Open Patent Application 62-62317. The objective lens is a plan apochromatic lens and has a magnification of 100 times, numerical aperture of 0.7 and working distance of 8.1 mm without deteriorating the spherical aberration, astigmatism or other characteristics by setting the optical constant of each lens of a predetermined range. However, in order to more efficiently inspect under a microscope, the invention described is not sufficient. It is desirable that the objective lens have a magnification of the order of 200 times and the working distance of more than 10 mm.

Other objective lenses are disclosed in Japanese Laid Open Patent Application 60-209715, U.S. Pat. No. 4,588,264, and U.S. Pat. No. 5,132,845.

The invention of Japanese Laid Open Pat. Application 60-209715 provides an objective lens having a high magnification. However, simply increasing the magnification causes the working distance to decrease.

U.S. Pat. No. 4,588,264 discloses an objective lens having magnification of 60 times, NA of 0.7 and working distance of 5 mm.

U.S. Pat. 5,132,845 discloses an objective lens having magnification of 250 times, NA of 0.9 and working distance of 1.2558 mm.

SUMMARY OF THE INVENTION

The present invention provides a microscope objective lens having a high magnification, in the order of 150 to 200 times, a high resolving power and a long working distance, greater than 10 mm.

The present invention provides an objective lens for a microscope including a first lens group positioned far from a surface of an object and having a negative refractive power as a whole. A second lens group, disposed between the object and the first lens group, has a positive refractive power as a whole. The first lens group includes two compound lenses comprising cememted doublets, each with a lens convex toward the object and a lens concave toward the object. The second lens group includes a lens convex toward the object, compound lenses, each including a lens convex toward the object and a lens concave toward the object, at least one of which being a compound lens comprising a cemented triplet, and three meniscus lenses concave toward the object.

The objective lens of the present invention is composed so as to satisfy the following conditions:

$$5F<D<15F \tag{1}$$

$$F<|F1|<2.5F \tag{2}$$

$$25<v2p-v2n<60 \tag{3}$$

$$0.01F<1/r<0.06F \tag{4}$$

$$1.6<n \tag{5}$$

where:
- D is the distance between the first lens group and the second lens group;
- F is the focal length of the objective lens;
- F1 is the focal length of the first lens group;
- v2p is the average Abbe number of the convex lenses of the second lens group;
- v2n is the average Abbe number of the concave lenses of the second lens group;
- r is radius of curvature of an object side surface of the meniscus lens; and
- n is the refractive index of the object side end lens at the d-line.

Condition (1) defines the distance between the first and second lens group. If the distance D is larger than 15F, it is difficult to establish a working distance (WD) larger than 10 mm, although the focal power of the first lens group may be reduced, thereby conferring an advantage on aberration correction. If the distance D is smaller than 5F, although the working distance may be increased, the focal power of the first lens group must be increased. As a result, spherical aberration, comatic aberration and other imperfections develop which cannot be corrected. In addition, the negative value of the Petzval sum increases. Therefore, it is necessary to satisfy the condition (1) in order to increase the working distance while correcting aberration.

Condition (2) defines the focal length of the first lens group. When the absolute value of the focal length F1 is larger than 2.5F, a working distance cannot be obtained. If the absolute value of F1 is smaller than F, aberrations in the first lens group increase. It is difficult to correct the increased aberration at the second lens group. Therefore, condition (2) is necessary for correcting the aberrations and increasing the working distance.

Condition (3) defines the Abbe number of each lens of the second lens group. When the difference between the average Abbe numbers of the convex lens and the concave lens is greater than 60, it is advantageous to aberration correction since the focal power of each convex lens and concave lens may be reduced. However, a large second order spectrum develops which is difficult to correct. When the difference is lower than 25, the focal power of each of the convex lenses and concave lenses becomes too strong to correct high order aberrations, such as spherical and comatic aberration, which develop because of increased focal power. Condition (3) is necessary for restricting aberrations within the predetermined range.

Condition (4) defines the meniscus lens at the object side end of the second lens group. When the radius of curvature 1/r becomes larger than 0.06F, the working distance largely decreases. If the radius of curvature 1/r becomes smaller than 0.01F, although the working distance increases, the lens largely deviates from aplanatic conditions, thereby generating a spherical aberration which is difficult to correct. Therefore, condition (4) also is necessary for correcting aberrations and increasing the working distance.

Condition (5) also defines the meniscus lens at the object side end in the second lens group. When the refractive index n becomes smaller than 1.6, the radius of curvature of the convex surface of the meniscus lens becomes extremely small, causing a remarkable generation of spherical aberration. It is difficult to correct such spherical aberration.

The objective lens of the present invention is composed to further satisfy the following condition:

$$0.2 < n2n - n2p \qquad (6)$$

where:

n2p is the average refractive index of the convex lenses of the second lens group at the d-line; and n2n is the average refractive index of the concave lenses of the second lens group at the d-line.

Condition (6) defines the refractive indexes of the concave lenses and the convex lenses of the compound lenses in the second lens group. If the difference between the refractive indexes is smaller than 0.2, the special spherical aberration in the third order range cannot be corrected unless the radius of curvature of the compound surface is severe. Furthermore, high order spherical and comatic aberrations develop, which are difficult to correct. Condition (6) is necessary for easily correcting aberrations.

There and other features of the invention will become more apparent from the following detailed description with reference to the accompanying drawings.

BRIEF DESCRIPTION OF THE DRAWINGS

Similar reference characters denote corresponding features of the invention consistently throughout the attached drawings in which.

DETAILED DESCRIPTION OF PREFERRED EMBODIMENTS

Figure 1:
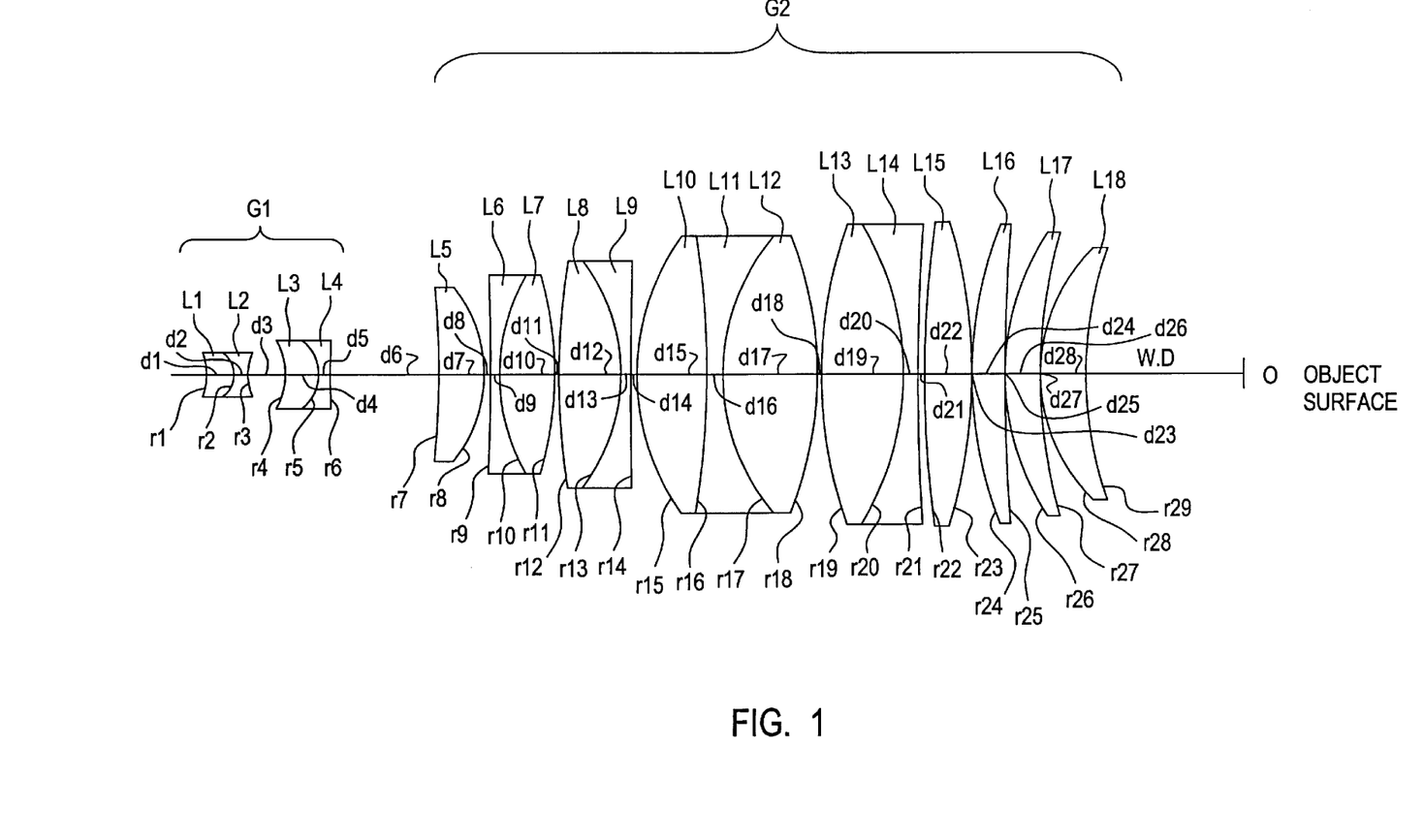
FIG. 1 is a schematic of a first embodiment of the objective lens of the present invention.

Referring to FIG. 1 showing an objective lens of the first embodiment of the present invention, the objective lens includes a first lens group G1 positioned far from a surface O of an object and having a negative refractive power as a whole. A second lens group G2 is disposed at a side near the surface O of the object and has a positive refractive power as a whole.

The first lens group G1 includes a compound lens with a lens L1 having a convex surface facing the object side and a biconcave lens L2, and a compound lens with a lens L3 having a convex surface facing the object side and a lens L4 having a concave surface facing the image side. The second lens group G2 has single lenses and compound lenses, each with a convex and a concave lens. At least one of the compound lenses has three lenses. Convex lenses near the object include three meniscus lenses.

More particularly, the second lens group G2 includes, in order from the side farthest from the object surface O, a single lens L5 having a convex surface facing the object side, a compound lens comprising a cemented doublet with a lens L6 having a concave surface facing the object side and a biconvex lens L7, a compound lens comprising a cemented doublet with a lens L8 having a convex surface facing the object side and a lens L9 having a concave surface facing the image side, a compound lens comprising a cemented triplet with a biconvex lens L10, a biconcave lens L11 and a biconvex lens L12, a compound lens comprising a cemented doublet with a biconvex lens L13 and a lens L14 having a concave surface facing the image side, a single lens L15 having a convex surface facing the object side, and three meniscus lenses L16, L17 and L18. Each of the meniscus lenses L16, L17 and L18 is disposed such that the concave surfaces thereof face the object surface O.

The objective lens of the present invention is composed so as to satisfy the following six conditions:

$$5F < D < 15F \qquad (1)$$

$$F < |F1| < 2.5F \qquad (2)$$

$$25 < v2p - v2n < 60 \qquad (3)$$

$$0.01F < 1/r < 0.06F \qquad (4)$$

$$1.6 < n \qquad (5)$$

$$0.2 < n2n - n2p \qquad (6)$$

where:

D is the distance (d6) between the first and second lens groups G1 and G2;

F is the focal length of the objective lens;

F1 is the focal length of the first lens group G1;

v2p is the average Abbe number of the convex lenses of the second lens group;

v2n is the average Abbe number of the concave lenses of the second lens group;

r is the radius of curvature of an object side surface of the meniscus lens L18 disposed at the object side end;

n is the refractive index of the object side lens L18 at the d-line;

n2p is the average refractive index of the convex lenses of the second lens group at the d-line; and n2n is the average refractive index of the concave lenses of the second lens group at the d-line.

According to the first embodiment, an objective lens which has a long working distance (WD) between the vertex of the object side end meniscus lens L18 and the object surface O as 14.81 mm was obtained when the optical constants of each lens were established as shown in Table 1 resulting in a magnification of 200 times, the numerical aperture of the object side of 0.62 and the focal length of 1 mm when an image of an object is formed by an imagery lens having a focal length of 200 mm.

TABLE 1

| | | | | |
|---|---|---|---|---|
| r1 = −3.996 | d1 = 2.37 | n1 = 1.84666 | v1 = 23.8 | L1 |
| r2 = −2.359 | d2 = 1.1 | n2 = 1.72916 | v2 = 54.7 | L2 |
| r3 = 4.68 | d3 = 3.7 | | | |
| r4 = −7 | d4 = 3 | n3 = 1.84666 | v3 = 23.8 | L3 |
| r5 = −3.654 | d5 = 1 | n4 = 1.72916 | v4 = 54.7 | L4 |
| r6 = 50.143 | d6 = 10.38 | | | |
| r7 = −105.29 | d7 = 4.4 | n5 = 1.456 | v5 = 90.3 | L5 |
| r8 = −11.998 | d8 = 0.5 | | | |
| r9 = −190.02 | d9 = 1 | n6 = 1.7725 | v6 = 49.6 | L6 |
| r10 = 17.926 | d10 = 5.2 | n7 = 1.456 | v7 = 90.3 | L7 |

TABLE 1-continued

| | | | | |
|---|---|---|---|---|
| r11 = −33.12 | d11 = 0.4 | | | |
| r12 = 87.434 | d12 = 6 | n8 = 1.497 | v8 = 81.6 | L8 |
| r13 = −15.994 | d13 = 1.1 | n9 = 1.804 | v9 = 46.6 | L9 |
| r14 = ∞ | d14 = 0.3 | | | |
| r15 = 21.737 | d15 = 6.7 | n10 = 1.456 | v10 = 90.3 | L10 |
| r16 = −73.71 | d16 = 1.5 | n11 = 1.7433 | v11 = 49.2 | L11 |
| r17 = 18.6 | d17 = 9.3 | n12 = 1.456 | v12 = 90.3 | L12 |
| r18 = −30.654 | d18 = 0.22 | | | |
| r19 = 41.109 | d19 = 7.9 | n13 = 1.456 | v13 = 90.3 | L13 |
| r20 = −24.465 | d20 = 1.5 | n14 = 1.6935 | v14 = 53.3 | L14 |
| r21 = 421 | d21 = 0.54 | | | |
| r22 = 128.56 | d22 = 4.3 | n15 = 1.497 | v15 = 81.6 | L15 |
| r23 = −43.495 | d23 = 0.22 | | | |
| r24 = 39.71 | d24 = 3.1 | n16 = 1.456 | v16 = 90.3 | L16 |
| r25 = 171.29 | d25 = 0.22 | | | |
| r26 = 23.742 | d26 = 3.1 | n17 = 1.456 | v17 = 90.3 | L17 |
| r27 = 44.992 | d27 = 0.24 | | | |
| r28 = 16.498 | d28 = 4 | n18 = 1.755 | v18 = 52.3 | L18 |
| r29 = 35.994 | | | | |

In Table 1, each of reference numerals r1 to r29 represents the radius of curvature of each surface of each lens. For example, r7 and r8 are radii of curvature of the lens L5. Each of d1 to d28 is the thickness and the distance between lenses, and each of n1 to n18 is the refractive index of each lens on the d-line, and each of v1 to v18 is Abbe number of each lens.

In Table 1, the lens distance D between the first lens group G1 and the second lens group G2 is d6, preferably 10.38 mm, which is about ten times the focal length F. This relationship satisfies condition (1).

The absolute value of the focal length F1 of the first lens group G1 is 1.6. Therefore, |F1|=1.6F. This relationship satisfies condition (2).

The difference (v2p−v2n) between average Abbe numbers of the convex lenses and the concave lenses of the second lens group G2 is 35.1, which satisfies condition (3).

The radius r29 of the concave surface of the meniscus lens L18 is 35.994, and hence 1/r=0.028F. This relationship satisfies condition (4).

The refractive index of the meniscus lens L18 on the d-line is 1.755 which satisfies condition (5).

The difference (n2n−n2p) between the average refractive indexes of the concave lenses and convex lenses of the compound lenses in the second lens group is 0.298, thereby satisfying condition (6).

Figure 2A:
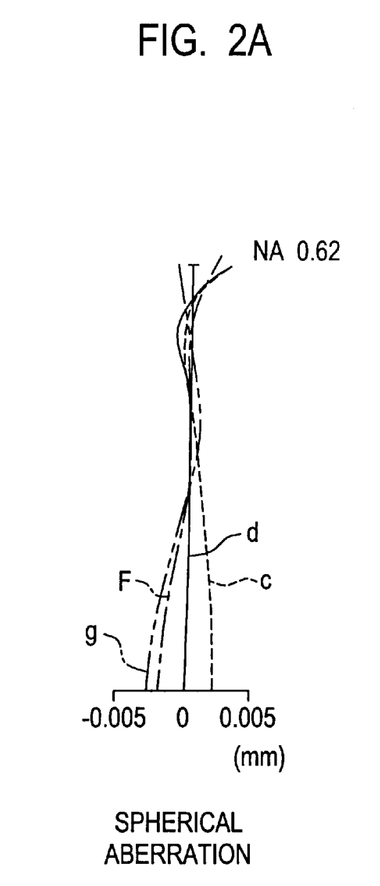
FIGS. 2A–C are graphical representations of various aberrations of the first embodiment.
Figure 2B:
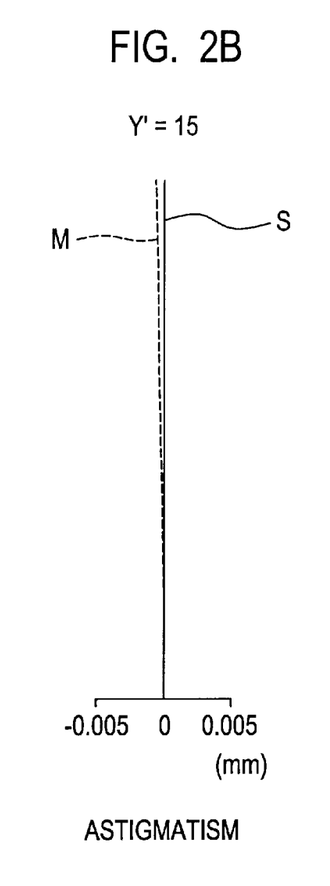
Figure 2C:
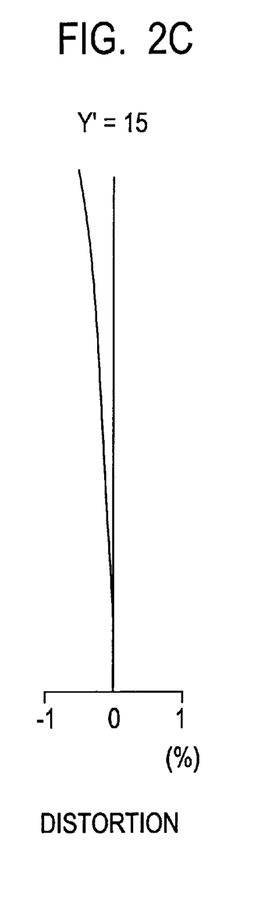

FIGS. 2A to 2C show the spherical aberration, astigmatism and distortion of the objective lens of the first embodiment. FIG. 2A shows spherical aberrations on the d-line, g-line, F-line and C-line. FIG. 2B is the astigmatism, and FIG. 2C shows the distortion. The letter Y' represents the image height (15 mm) when an image of an object is formed by an imagery lens having a focal length of 200 mm. It will be understood from the drawings that, in the objective lens of the first embodiment, the respective aberrations are properly corrected in spite of comparatively large numerical aperture (0.62), high magnification and long working distance.

Figure 3:
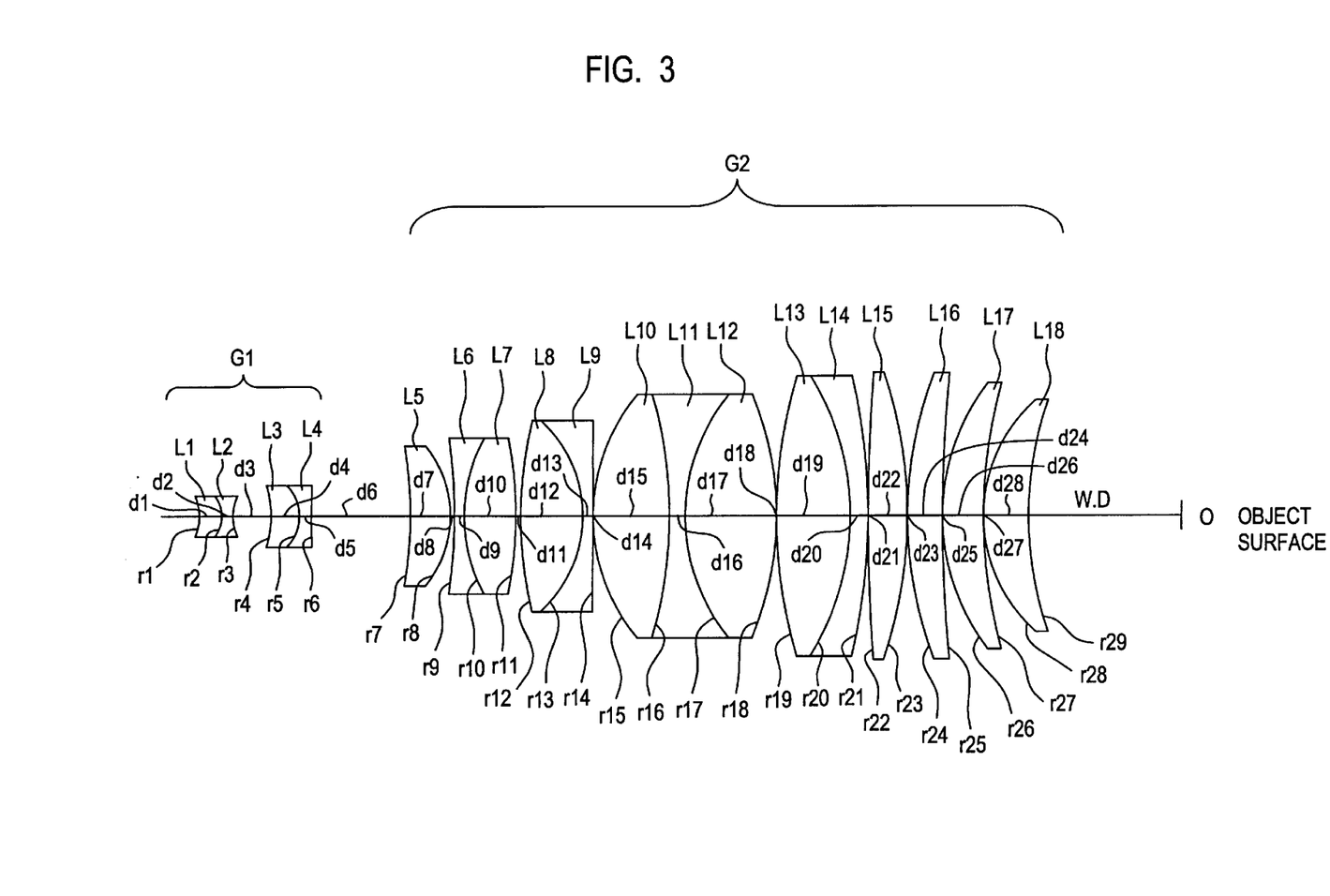
FIG. 3 is a schematic of a second embodiment of the objective lens of the present invention.

FIG. 3 shows the objective lens according to the second embodiment of the present invention. The objective lens of the second embodiment is different from the objective lens of the first embodiment shown in FIG. 1 with respect to the compound lens including convex lens L8 and concave lens L9. The object side surface of the lens L9 of FIG. 1 is flat with an infinite radius of curvature, while the object side surface of the lens L9 of FIG. 1 of FIG. 3 has a finite curvature.

According to the second embodiment, an objective lens which has a long working distance (WD) between the vertex of the object side end meniscus lens L18 and the object surface O as 15.13 mm was obtained when the optical constants of each lens were established as shown in the Table 2 resulting in a magnification of 200 times, the numerical aperture of the object side of 0.6 and the focal length of 1 mm when an image of an object is formed by an imagery lens having a focal length of 200 mm.

TABLE 2

| | | | | |
|---|---|---|---|---|
| r1 = −4.68 | d1 = 2.2 | n1 = 1.84666 | v1 = 23.8 | L1 |
| r2 = −2.47 | d2 = 1.2 | n2 = 1.741 | v2 = 52.7 | L2 |
| r3 = 5.1 | d3 = 3.8 | | | |
| r4 = −7.58 | d4 = 2.8 | n3 = 1.84666 | v3 = 23.8 | L3 |
| r5 = −3.816 | d5 = 1.1 | n4 = 1.741 | v4 = 52.7 | L4 |
| r6 = ∞ | d6 = 10.05 | | | |
| r7 = −38.63 | d7 = 4 | n5 = 1.456 | v5 = 90.3 | L5 |
| r8 = −10.659 | d8 = 0.5 | | | |
| r9 = −54.009 | d9 = 1 | n6 = 1.7725 | v6 = 49.6 | L6 |
| r10 = 18.052 | d10 = 5 | n7 = 1.456 | v7 = 90.3 | L7 |
| r11 = −29.295 | d11 = 0.5 | | | |
| r12 = 55.23 | d12 = 6.3 | n8 = 1.456 | v8 = 90.3 | L8 |
| r13 = −12.23 | d13 = 1 | n9 = 1.7725 | v9 = 49.6 | L9 |
| r14 = 517.4 | d14 = 0.2 | | | |
| r15 = 20.317 | d15 = 7.5 | n10 = 1.456 | v10 = 90.3 | L10 |
| r16 = −39.503 | d16 = 1.5 | n11 = 1.7432 | v11 = 49.3 | L11 |
| r17 = 18.191 | d17 = 9.3 | n12 = 1.456 | v12 = 90.3 | L12 |
| r18 = −30.144 | d18 = 0.2 | | | |
| r19 = 60.034 | d19 = 7.3 | n13 = 1.456 | v13 = 90.3 | L13 |
| r20 = −23.253 | d20 = 1.5 | n14 = 1.691 | v14 = 54.7 | L14 |
| r21 = −62.329 | d21 = 0.3 | | | |
| r22 = 392 | d22 = 3.7 | n15 = 1.456 | v15 = 90.3 | L15 |
| r23 = −44.557 | d23 = 0.2 | | | |
| r24 = 35.994 | d24 = 3.6 | n16 = 1.456 | v16 = 90.3 | L16 |
| r25 = 216.5 | d25 = 0.21 | | | |
| r26 = 22.745 | d26 = 3.7 | n17 = 1.456 | v17 = 90.3 | L17 |
| r27 = 52 | d27 = 0.25 | | | |
| r28 = 16.277 | d28 = 4.1 | n18 = 1.618 | v18 = 63.4 | L18 |
| r29 = 35.994 | | | | |

In Table 2, the lens distance D between the first lens group G1 and the second lens group G2 is d6, preferably 10.05 mm, which is about ten times the focal length F. This relationship satisfies condition (1).

The absolute value of the focal length F1 of the first lens group G1 is 1.98. Therefore, |F1|=1.98F. This relationship satisfies condition (2).

The difference (v2p−v2n) between average Abbe numbers of the convex lenses and the concave lenses of the second lens group G2 is 36.8, which satisfies condition (3).

The radius r29 of the concave surface of the meniscus lens L18 is 35.994, and hence 1/r=0.028F. This relationship satisfies condition (4).

The refractive lens index of the meniscus lens L18 on the d-line is 1.618 which satisfies condition (5).

The difference (n2n−n2p) between the average refractive indexes of the concave lenses and convex lenses of the compound lenses in the second lens group G2 is 0.298, thereby satisfying condition (6).

Figure 4A:
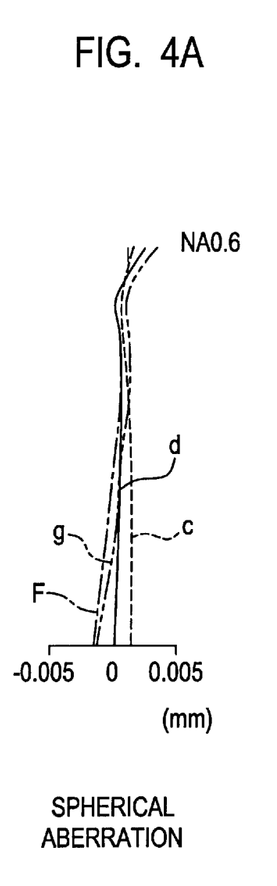
FIGS. 4A–C are graphical representations of various aberrations of the second embodiment.
Figure 4B:
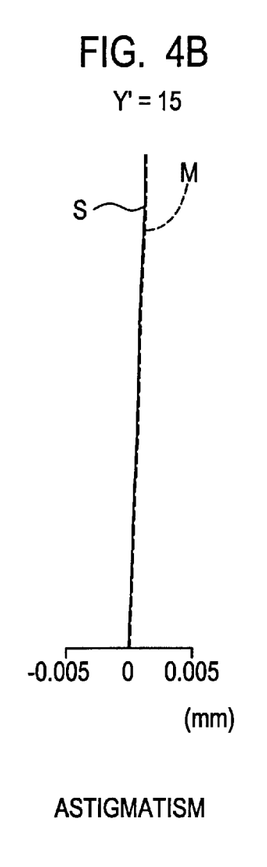
Figure 4C:
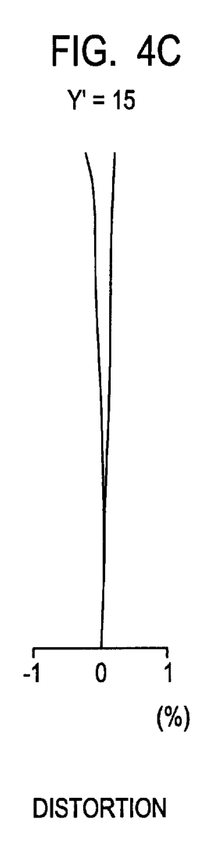

FIGS. 4A to 4C shows the spherical aberration, astigmatism and distortion of the objective lens of the second embodiment. FIG. 4A shows spherical aberrations on the d-line, g-line, F-line and C-line. FIG. 4B is the astigmatism, and FIG. 4C shows the distortion. The letter Y' represents the image height (15 mm) when an image of an object is formed by an imagery lens having a focal length of 200 mm. It will be understood from the drawings that, in the objective lens of the second embodiment, the respective aberrations are properly corrected in spite of comparatively large numerical aperture (0.6), high magnification and long working distance.

Figure 5:
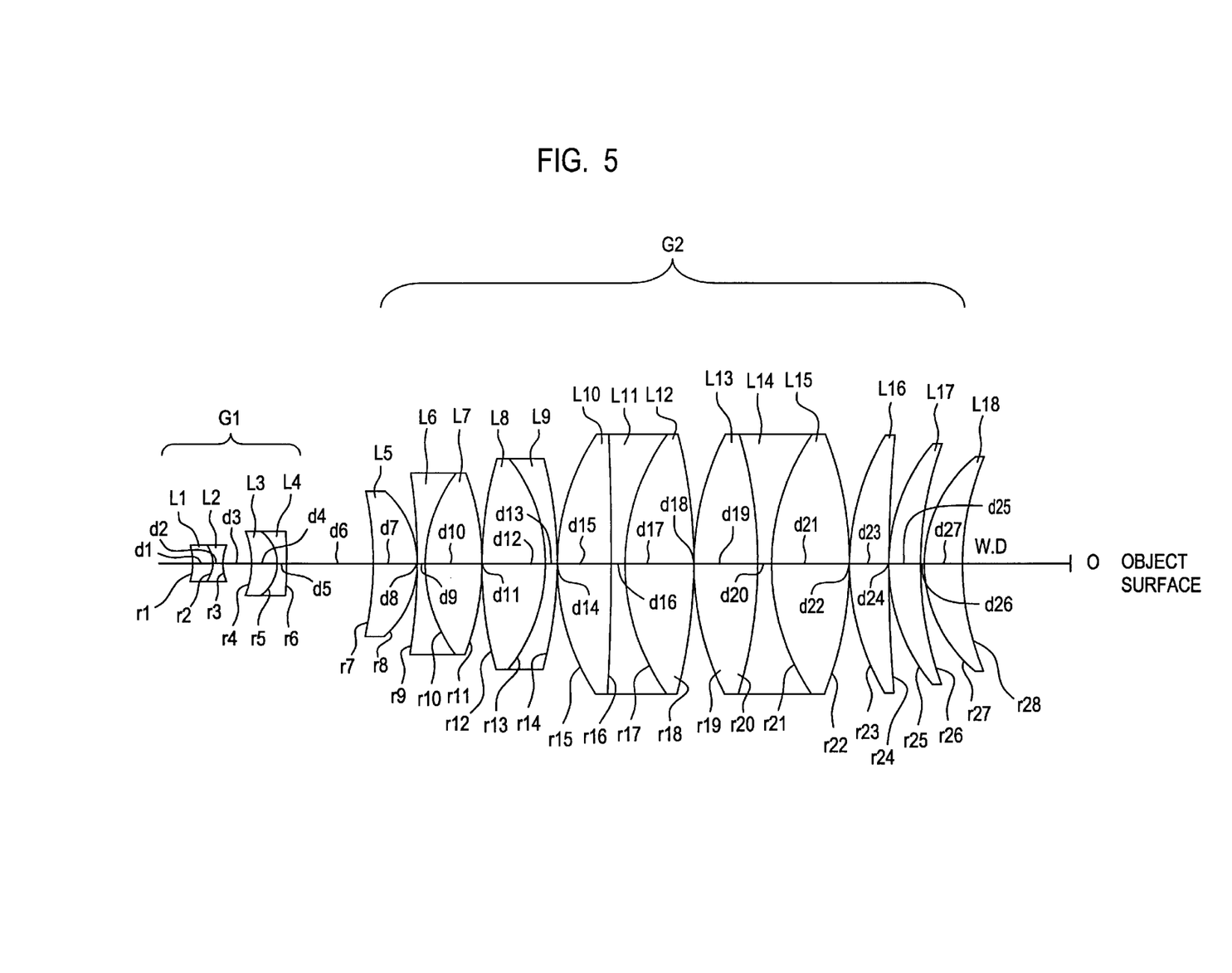
FIG. 5 is a schematic of a third embodiment of the objective lens of the present invention.

FIG. 5 shows the objective lens according to the third embodiment of the present invention. The objective lens of the third embodiment is different from the objective lens of the first embodiment shown in FIG. 1 in that the second lens group G2 includes, in order from the side farthest from the surface O of the object, a single lens L5 having a convex surface facing the object side, a compound lens comprising a cemented doublet with a lens L6 having a concave surface facing the object side, and a biconvex L7, a compound lens comprising a cemented doublet with a lens L8 having a convex surface facing the object side and a lens L9 having a concave surface facing the image side and having a convex surface facing the object side, a compound lens comprising a cemented triplet with a biconvex lens L10, a biconcave lens L11, and a biconvex lens L12, a compound lens comprising a cemented triplet with a biconvex lens L13, a biconcave lens L14, and a biconvex lens L15, and three meniscus lenses L16, L17 and L18, hence including two compound lenses comprising cemented triplets.

According to the third embodiment, an objective lens which has a long working distance (WD) between the vertex of the object side end meniscus lens L18 and the object surface O as 12.00 mm was obtained when the optical constants of each lens were established as shown in Table 3 resulting in a magnification of 200 times, the numerical aperture of the object side of 0.7 and the focal length of 1 mm when an image of an object is formed by an imagery lens having a focal length of 200 mm.

TABLE 3

| r1 = −3.986 | d1 = 2.3 | n1 = 1.84666 | v1 = 23.8 | L1 |
|---|---|---|---|---|
| r2 = −2.36 | d2 = 1 | n2 = 1.72916 | v2 = 54.7 | L2 |
| r3 = 4.68 | d3 = 3.2 | | | |
| r4 = −6.78 | d4 = 2.8 | n3 = 1.84666 | v3 = 23.8 | L3 |
| r5 = −3.816 | d5 = 1 | n4 = 1.72916 | v4 = 547 | L4 |
| r6 = 120 | d6 = 9.8 | | | |
| r7 = −31.65 | d7 = 4.7 | n5 = 1.456 | v5 = 90.3 | L5 |
| r8 = −10.659 | d8 = 0.3 | | | |
| r9 = −54.942 | d9 = 1 | n6 = 1.7725 | v6 = 49.6 | L6 |
| r10 = 16.9 | d10 = 6 | n7 = 1.456 | v7 = 90.3 | L7 |
| r11 = −31.201 | d11 = 0.38 | | | |
| r12 = 53.736 | d12 = 7 | n8 = 1.497 | v8 = 81.6 | L8 |
| r13 = −16.626 | d13 = 1 | n9 = 1.804 | v9 = 466 | L9 |
| r14 = 51.16 | d14 = 0.3 | | | |
| r15 = 25.654 | d15 = 6 | n10 = 1.456 | v10 = 90.3 | |
| r16 = 160 | d16 = 1.5 | n11 = 1.741 | v11 = 52.7 | L11 |
| r17 = 23.253 | d17 = 7.8 | n12 = 1.456 | v12 = 90.3 | L12 |
| r18 = −53.15 | d18 = 0.3 | | | |
| r19 = 33.98 | d19 = 7 | n13 = 1.43875 | v13 = 95 | L13 |
| r20 = −45.2 | d20 = 1.5 | n14 = 1.6935 | v14 = 53.3 | L14 |
| r21 = 23.628 | d21 = 8.8 | n15 = 1.43875 | v15 = 95 | L15 |
| r22 = −35.407 | d22 = 0.2 | | | |
| r23 = 28.369 | d23 = 4 | n16 = 1.456 | v16 = 90.3 | L16 |
| r24 = 146.2 | d24 = 0.25 | | | |
| r25 = 20.972 | d25 = 3.6 | n17 = 1.497 | v17 = 81.6 | L17 |
| r26 = 42.011 | d26 = 0.26 | | | |
| r27 = 15.525 | d27 = 4.1 | n18 = 1.7725 | v18 = 49.6 | L18 |
| r28 = 31.994 | | | | |

In Table 3, the lens distance D between the first lens group G1 and the second lens group G2 is d6, preferably 9.8 mm, which is about ten times the focal length F. This relationship satisfies condition (1).

The absolute value of the focal length F1 of the first lens group G1 is 1.7. Therefore, |F1|=1.7F, satisfying condition (2).

The difference (v2p−v2n) between average Abbe numbers of the convex lenses and the concave lenses of the second lens group G2 is 34.9, which satisfies condition (3).

The radius r29 of the concave surface of the meniscus lens L18 is 31.994, and hence 1/r=0.031F. This relationship satisfies condition (4).

The refractive index of the meniscus lens L18 on the d-line is 1.7725 which satisfies condition (5).

The difference (n2n−n2p) between the average refractive indexes of the concave lenses and convex lenses of the compound lenses in the second lens group is 0.296, thereby satisfying condition (6).

Figure 6A:
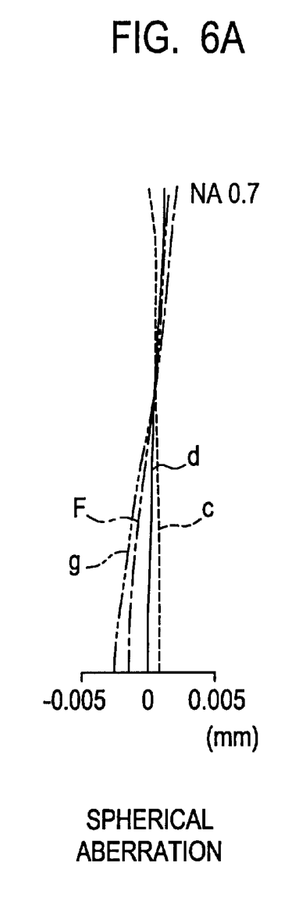
FIG. 6A–C are graphical representations of various aberrations of the third embodiment.
Figure 6B:
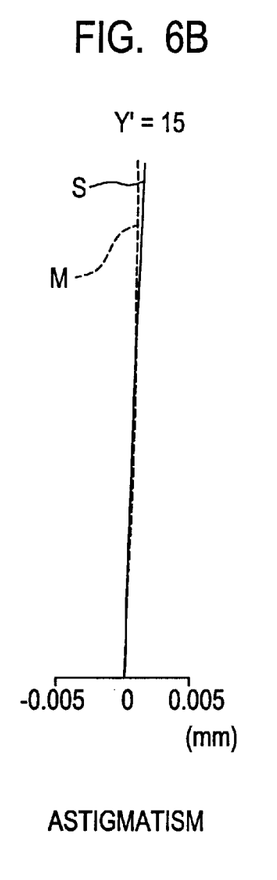
Figure 6C:
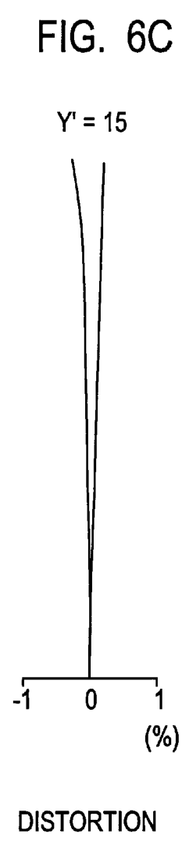

FIGS. 6A to 6C show the spherical aberration, astigmatism and distortion of the objective lens of the third embodiment. FIG. 6A shows spherical aberrations on the d-line, g-line, F-line and C-line. FIG. 6B is the astigmatism, and FIG. 6C shows the distortion. The letter Y' represents the image height (15 mm) when an image of an object is formed by an imagery lens having a focal length of 200 mm. It will be understood from the drawings that, in the objective lens of the first embodiment, the respective aberrations are properly corrected in spite of comparatively large numerical aperture (0.7), high magnification and long working distance.

While the specific embodiments have been described, the present invention is not limited to the embodiments, and changes may be incorporated within the technical idea of the present invention. For example, the number of lenses, and in the disposition of the convex lenses, concave lenses, and compound lenses of the first lens group G1 and the second lens group G2 may be modified.

Although the particular embodiment of the objective lens for a microscope of the infinity-correction type has been described, the objective lens may be used as an objective lens of a finite-correction type by providing a well-connected small imagery lens at an image surface side position of the first lens group G1.

From the foregoing, it will be understood that the present invention provides an objective lens having a resolving power, a high magnification, and a long working distance without deteriorating the correcting characteristics for various aberrations, thereby remarkably increasing working efficiency under a microscope employing the lens configuration of the present invention.

While the invention has been described in conjunction with preferred specific embodiment thereof, it will be understood that this description is intended to illustrate and not limit the scope of the invention, which is defined by the following claims.

What is claimed is:

1. An objective lens for a microscope comprising:
   a first lens group positioned far from a surface of an object and having a negative refractive power;
   a second lens group disposed between the object and said first lens group and having a positive refractive power;
   said first lens group including a compound lens comprising a cemented doublet with a lens having a convex surface facing the object side and a lens having a concave surface facing the image side; and
   said second lens group including a single lens having a convex surface facing the object side, a compound lens comprising a cemented doublet with a lens having a convex surface facing the object side and a lens having a concave surface facing the image side, a first compound lens comprising a cemented triplet, and three meniscus lenses proximate to the object with a concave surface of the meniscus lens of said three meniscus lenses closest to the object facing the object;
   wherein said objective lens satisfies the following conditions:

$5F < D < 15F;$ $F < |F1| < 2.5F;$ $25 < v2p - v2n < 60;$ $0.01F < 1/r < 0.06F;$ and $1.6 < n;$ where D is a distance between said first lens group and said second lens group, F is a focal length of said objective lens, F1 is a focal length of said first lens group, ν2p is an average Abbe number of all convex lenses of said second lens group, ν2n is an average Abbe number of all concave lenses of said second lens group, r is a radius of curvature of said concave surface of said meniscus lens, and n is a refractive index of an object side end of said objective lens at d-line.

2. The objective lens according to claim 1, wherein said objective lens satisfies the following condition:

$0.2 < n2n - n2p;$ where n2p is an average refractive index of said lenses with convex surfaces of said second lens group at the d-line, and n2n is an average refractive index of said lenses with concave surfaces of said second lens group at the d-line.

3. The objective lens according to claim 1 wherein one of said compound lens and said first compound lens of said second lens group comprises a lens having a convex surface facing the object side and a concave lens having a concave surface facing the image side and a flat surface at the object side.

4. The objective lens according to claim 1 wherein one of said compound lens and said first compound lens of said second lens group comprises a lens having a convex surface facing the object side and a concave lens having a concave surface facing the image side and a finite curvature at the object side.

5. The objective lens according to claim 1, said second lens group further comprising a second compound lens comprising a cemented triplet with a first lens having a convex surface facing the object side, a lens having a concave surface facing the object side and a second lens having a convex surface facing the object side.

6. An objective lens for a microscope device comprising:
a first lens group having a negative refractive power; and
a second lens group having a positive refractive power, including at least one lens having a convex surface facing the object side, at least one lens having a concave surface facing the image side and at least one meniscus lens;
wherein said objective lens satisfies:

$5F < D < 15F;$ $F < |F1| < 2.5F;$ $25 < \nu 2p - \nu 2n < 60;$ $0.01F < 1/r < 0.06F;$ and $1.6 < n;$ wherein: D is a distance between said first lens group and said second lens group; F is a focal length of said objective lens; F1 is a focal length of said first lens group; ν2p is an average Abbe number of all convex lenses of said second lens group; ν2n is an average Abbe number of all said lenses with concave surfaces of said second lens group; r is a curvature radius of an object side surface of said at least one meniscus lens closest to an object; and n is a refractive index of an object side of said at least one meniscus lens closest to the object at a d-line.

7. The objective lens of claim 6, wherein said objective lens satisfies:

$0.2 < n2n - n2p;$ wherein n2n is an average refractive index of said lenses with concave surfaces of said second lens group at the d-line; and n2p is an average refractive index of said lenses with convex surfaces of said second lens group at the d-line.

8. The objective lens of claim 6, said first lens group comprising a first compound lens comprising cemented lenses.

9. The objective lens of claim 8, said first compound lens comprising cemented lenses including a lens having a convex surface facing the object side and a concave lens having a concave surface facing the image side.

10. The objective lens of claim 8, said first lens group comprising a second compound lens comprising cemented lenses.

11. The objective lens of claim 6, said second lens group further comprising a first compound lens comprising cemented lenses.

12. The objective lens of claim 11, said first compound lens including a lens having a concave surface facing the object side and a lens having a convex surface facing the object side.

13. The objective lens of claim 12, said first compound lens further including a second lens having a convex surface facing the object side.

14. The objective lens of claim 11, said second lens group further comprising a second compound lens comprising cemented lenses.

15. The objective lens of claim 14, said second lens group further comprising a third compound lens comprising cemented lenses.

16. The objective lens of claim 15, said second lens group further comprising a fourth compound lens comprising cemented lenses.

17. The objective lens of claim 6, said second lens group further comprising a second lens having a convex surface facing the object side.

18. The objective lens of claim 6, said second lens group further comprising a second meniscus lens.

19. The objective lens of claim 18, said second lens group further comprising a third meniscus lens.

20. The objective lens of claim 6, wherein an object side surface of said at least one of said lenses with concave surfaces has an infinite curvature radius.

* * * * *